Patented Aug. 10, 1948

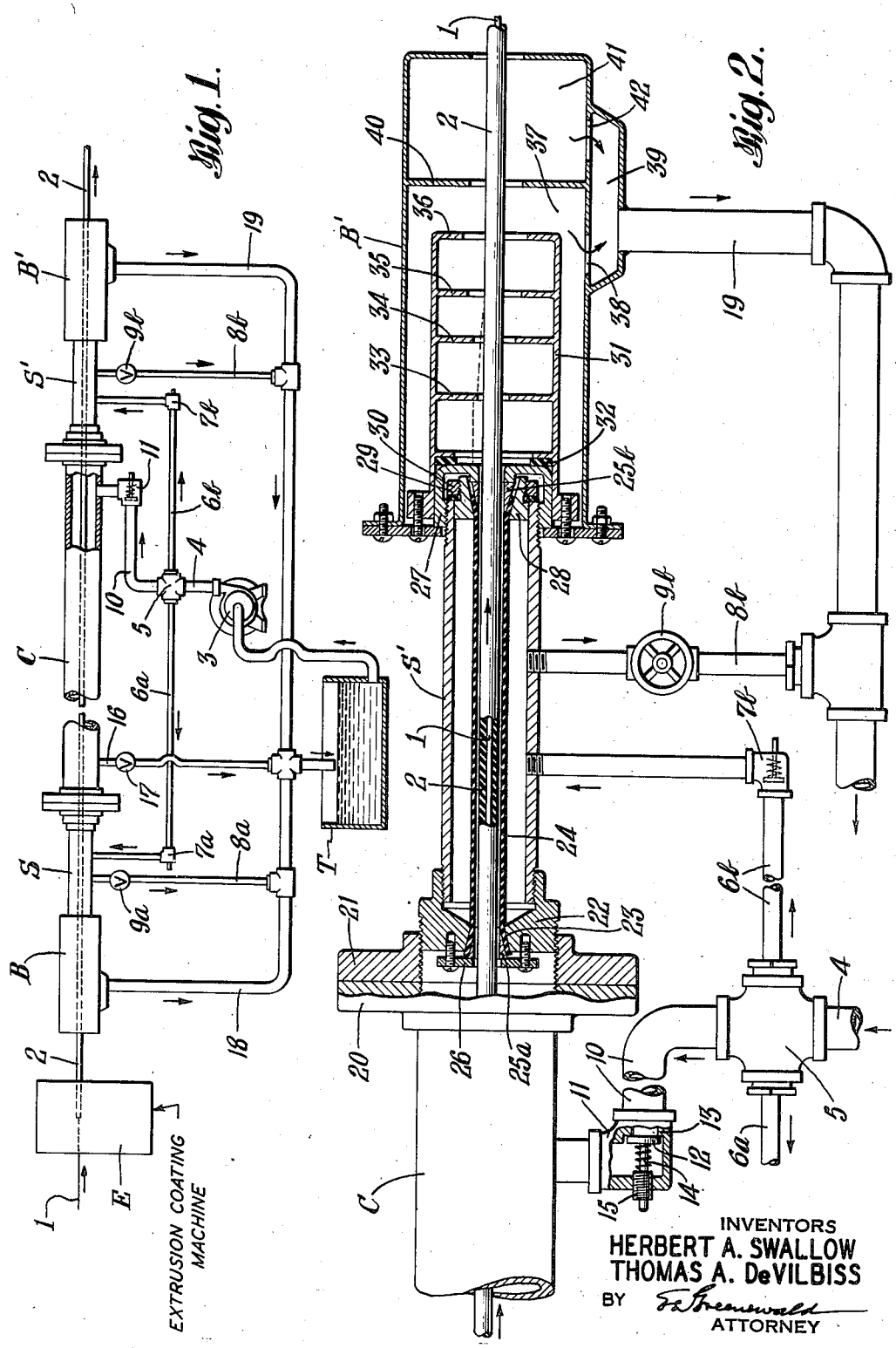

2,446,620

UNITED STATES PATENT OFFICE 2,446,620

AUTOMATIC PRESSURE SEALING DEVICE

Herbert A. Swallow and Thomas A. De Vilbiss, Plainfield, N. J., assignors to Bakelite Corporation, a corporation of New Jersey Application January 28, 1944, Serial No. 520,026

9 Claims. (Cl. 18—6)

This invention relates to apparatus for controlling the escape of compressed fluids from pressure vessels having openings or orifices penetrated by traveling rod-like elements. While the invention is hereinafter described with reference to its application on fluid pressure treating chambers employed in processing continuous lengths of organic plastic material with or without a metal core, the invention is also of use in other arts having equivalent requirements in controlling the escape of compressed fluids.

Continuous lengths of organic plastic material in rod form or as coatings on wires are usually formed by extruding machines in which the material is softened by heat to a plastic consistency and then forced through a die having an orifice designed to impart a desired cross-sectional shape to the plastic material. Depending upon the nature of the plastic material, subsequent treatment may be required such as exposure to hot or cold fluid under pressure; for instance, a thermo-reactive plastic, such as vulcanizable rubber coated on wire, is cured by passage through a confined atmosphere of steam or through a hot non-solvent liquid also under pressure. Again thermoplastic materials, such as polyethylene and polystyrene, require controlled cooling by fluid under pressure after extrusion, to directionally control the shrinkage occurring on cooling; water under pressure, but at various temperatures in different portions of the pressure-treating apparatus is generally used for this purpose.

In the interests of economy and speed of production, and also because of the inherent properties of many of the plastic materials, the pressure treatment is usually conducted on a continuous basis by leading the extruded length of plastic material directly from the extruding machine into and out of a pressure-treating chamber having a length permitting completion of the required pressure treatment during the time interval in which the plastic material travels through the chamber. Seals are supplied at the entrant and exit openings of the pressure-treating chamber, to prevent undue loss of the pressure fluid; and the seals are generally in the form of bushings encircling the plastic material and constructed of rubber or like resilient organic material to avoid excessive abrasion and deformation of the comparatively soft extruded plastic materials. A seal of this type is illustrated in the U. S. Patent No. 2,307,575 to Davis, and it is primarily dependent upon the bushing having a bore of smaller cross-sectional area than the rod of plastic material to obtain a sealing effect from the elastic resistance to distention of the bushing by a plastic rod of larger cross-sectional area. For this purpose it is necessary to have several sets of bushings with bores of a size corresponding to the cross-sectional area of the particular plastic element to be treated by fluid under pressure. The installation or replacement of one set of bushings by another on the pressure-treating chamber, however, consumes considerable time, for this change-over operation may be required several times during a single operating day, because such pressure-treating chambers process material at the rate of several hundred feet per minute and usually enable a number of runs of plastic of different diameters to be treated; the resulting down time of the pressure-treating machine then becomes an important factor in the cost of operations.

The limited size tolerance of the bushings for effective sealing becomes a serious problem when the cross-sectional size of the plastic element is subject to considerable variations along the length. Such variations are likely to occur, when the extruding machine is first put in operation and until an operating equilibrium is obtained between the feeding rate of raw plastic material into the screw of the extruder, and regulation of the heat supply for rendering the material plastic and the rate at which the extruded material is pulled out of the extruder die by haul-off reels causing variations from the specified cross-sectional size which may exceed 50 per cent plus or minus. As a consequence, the bushings either unduly constrict the thick portions of the extruded element, causing scuffing or even rupture of the plastic in extreme instances, or else fail to seal sufficiently when penetrated by an undersized portion of the extruded element to result in considerable loss of fluid from the pressure treating chamber.

The present invention provides a sealing means incorporating a bushing cooperable with fluid pressure control means to automatically regulate the amount of fluid escaping from a pressure treating chamber or other form of pressure container about an opening through which a rod-like element passes and whose cross-sectional area may be considerably smaller or larger than the bore of the bushing. In the preferred form of the invention, a casing or sealing chamber having an orifice at each end is secured to the pressure container about its opening in such manner that one orifice is immediately adjacent to the opening and open thereto, and the other orifice is opposite thereto and in alignment therewith. Mounted within the casing and extending from orifice to orifice is a thin-walled tubular bushing formed of rubber or other elastic organic material; the connections of the bushing to each orifice being fluid pressure tight, the bore of the bushing therefore forms an internal passage for the rod-like element through the casing, and the bushing walls create a sealed space within the casing in which fluid can be confined under pressure. By suitable control means, the pressure of the fluid in this sealed space can be adjusted to more or less counterbalance the opposing force of the fluid under pressure seeking to escape from the pressure-treating chamber along the rod-like element. Because the thin wall construction of the tubular bushing enables it to function essentially as a flexible and resilient non-porous membrane, the counterbalancing action is immediately sensitive and directly responsive to the fluid pressure control means.

The invention additionally provides automatic means for continuously maintaining the fluid in the sealed space that is applied to the external surface of the bushing, at a pressure in accordance with predetermined sealing requirements. Thus, when operating conditions permit or indicate the desirability of a certain leakage rate through the bushing, the fluid pressure-regulating means can be adjusted to continuously maintain the externally applied fluid at a pressure ranging from one barely above the pressure of the fluid within the pressure-treating chamber to one considerably lower. On the other hand, when leakage is to be held to a minimum, the fluid-regulating means can be adjusted to maintain a relatively higher fluid pressure against the external surface of the bushing; but in such operation the frictional resistance encountered by the traveling rod-like element increases accordingly.

In the preferred form of the sealing bushing the tube has a length in excess of its bore periphery, and relatively thin fluid impervious walls to offer a minimum elastic resistance to expansion or distention by an enclosed rod-like element of larger cross-sectional area. The thin walls are likewise more responsive to the externally applied fluid pressure and absorb less energy in the compression of the elastic walls than a conventional thick walled bushing. In those applications where the rod-like elements have an average or consistent cross-sectional area less than the normal or relaxed bore diameter of the flexible seal, it is essential that the tube be so installed in its chamber that it is longitudinally stretched at least 10 to 20 per cent or more. It has been found that a bushing installed so as to be under some permanent longitudinal tension can be constricted for sealing about an undersize diameter rod-like element by externally applied fluid having a pressure only slightly higher than that prevailing in the pressure-treating chamber and that the bushing surprisingly contracts without wrinkling or overlapping of its inner walls.

Since it is highly desirable that seals operating against moving surfaces have a low sealing friction, good practice limits the constrictive force of a seal around a moving rod-like element to a pressure barely adequate to confine the fluid in the pressure-treating chamber. A constant low frictional resistance to moving rod-like elements, attended with good sealing effect, can be obtained by means of the automatic fluid pressure control, for instance, by maintaining a differential in pressure as low as ½ to 1 lb. per sq. in. in the case of tubular bushings having a bore the cross-sectional area of which is equivalent to or larger than those of the rod-like elements passing through them; under such conditions there is only a slight leakage of pressure fluid from the pressure-treating chamber which is desirable for its lubricating properties on the plastic rod surfaces passing through. With a pressure differential of about 5 lbs. per sq. in. in favor of the counterapplied fluid pressure in the sealing chamber an almost hermetic seal is obtained, and with high pressure differentials (the maximum depending upon the bursting strength of the elastic material composing the seal) pronounced smoothing or shaping of the hot extruded plastic by the entering seal to the pressure-treating chamber is accomplished at the expense, however, of increased mechanical effort in pulling the extruded plastic shape through the seal.

When the bushings are penetrated by rod-like elements of an average or consistent cross-sectional area larger than the normal bore size of the tubular bushing, the pressure differential is adjusted so that the fluid in the sealed space of the sealing chamber is maintained at a lower pressure than the fluid in the pressure-treating chamber, and the constant potential difference between the two chambers can also be of a small order, such as 1 or 2 lbs. per sq. in., since the major constricting effect of the bushing against the encircled element is produced by the counteracting fluid pressure and only a minor amount by the thin wall bushing itself.

In the accompanying drawing an embodiment of the invention is illustrated in attachment to a pressure chamber for treating a wire coated with a plastic, in which drawing Fig. 1 shows an assembled fluid pressure-treating apparatus in side elevation and partly in section; and Fig. 2 illustrates in side elevation and partly in section a flexible bushing mounted in a casing or sealing chamber and its connection to the orifice of a pressure-treating chamber.

Referring to Fig. 1, a wire or other core material 1 is drawn through an extruding machine E which extrudes a plastic (polyethylene) covering 2 thereon to form the rod-like element. The coated wire is first drawn through a cylinder B containing baffle plates having orifices of decreasing diameter in the direction of movement, and next through a flexible tube in a casing or sealing chamber S. The sealing chamber S is at the entrant end of a pressure-treating chamber C through which the coated wire is continuously drawn and where it is subjected to either hot or cold fluid under pressure. The element emerges from the chamber C through a sealing chamber S', duplicate of chamber S, and out through another baffle-containing cylinder B' to be wound on reels (not shown) or otherwise further treated.

Fluid under pressure for the sealing chambers S and S' is supplied by a pressure pump 3 (or other means such as a steam boiler in the case of steam) through pipe 4, the fluid being directed by a four-way or cross-fitting 5 through pipes 6a and 6b, in which are interposed adjustable differential valves 7a and 7b, to sealing chambers S and S' respectively. From the sealing chambers S and S', the fluid under pressure can be returned to a supply tank T through the return pipes 8a and 8b in which are interposed throttling or adjustable relief valves 9a and 9b respectively.

From the cross-fitting 5, part of the fluid under pressure is directed to the pressure chamber C by means of the pipe 10 in which is interposed an adjustable differential valve 11. The construction of the differential valve 11 (and this construction is also the same for the differential valves 7a and 7b) and the location of its operating parts when in the closed position is shown in detail in Fig. 2; and it consists of a valve body in which are mounted a valve plug 12 forced against a valve seat 13 by pressure from a compression spring 14, the amount of pressure exerted by spring 14 being regulated by a screw bushing 15. To open the differential valve 11, fluid under a pressure in excess of the spring pressure exerted against valve plug 12 is supplied to the seating face side of valve plug 12 forcing it away from valve seat 13 and thereby allows fluid to flow into the pressure chamber C. The valve plug 12 is forced into a closed position when sufficient fluid has entered the pressure chamber C, so that its pressure together with the spring pressure exerted against valve plug 12 is equivalent to or higher than the pressure on the fluid acting to open the valve. Upon leakage of fluid from the pressure chamber C through the seals or escape of fluid through an exit pipe 16 connected to a throttling or pressure relief valve 17, there results a drop of fluid pressure in the pressure chamber C such that it, together with the spring pressure exerted to close the valve plug 12, is less than the fluid pressure for opening the valve; the valve 11 is then forced open until there has once more entered sufficient fluid under pressure into the pressure chamber C to attain equilibrium or closing conditions. Under normal operating conditions valve 11 remains in a partly open position to an extent depending upon the amount of fluid escaping from the pressure treating chamber C.

Fluid escaping from the pressure chamber C through the seals in the chambers S and S' is trapped in baffle chambers B and B' and returned as make-up supply through the return pipes 18 and 19 to supply tank T. Fluid flowing from the pressure chamber C through exit pipe 16 and throttling or adjustable relief valve 17 is likewise returned after being heated or cooled by means not shown as make-up supply; the throttling or relief valve 17 is for the purpose of controlling the temperatures, when necessary in the treatment of the traveling rod-like element while in the pressure chamber C, by permitting circulation of pressure fluid. When steam is the fluid, a trap can be substituted for the relief valve 17.

In Fig. 2 is shown a broken end portion of the pressure chamber C connected by means of a screw flange 20 to a duplicate screw flange 21 having internal threads to engage with the external threads of a plug bushing 22 screwed onto the cylindrical wall of the sealing chamber S'. The bushing 22 has a tapered entrance 23 that provides a seating surface for one end of a thin-walled tubular rubber bushing 24 forced onto the tapered seating surface by a retaining plug 25a having an external tapered shape complementary to the entrance 23 and an internal orifice large enough to permit the free passage of any rod-like element traveling through the pressure-treating apparatus. A retaining flange 26 having an orifice as large or larger than and coaxial with the orifice of the retaining plug 25a is bolted to the face of plug bushing 22 and forces the retaining plug bushing 25a against the tapered opening plug bushing 22 to form a fluid tight joint with the tubular bushing 24 clamped between them. A modified retaining arrangement is provided at the emergent end of sealing chamber S' to permit longitudinal stretching of the rubber bushing 24 during installation; it consists of an internally threaded cap 27 having in its crown a dished-in opening coaxially aligned with the bore of the plug bushing 22 when the cap 27 is screwed on to the opposite end of the cylindrical wall of the sealing chamber S'; the dished-in opening of cap 27 bears against the wide end of a tapered bushing 25b to force it (after the other end portion of tubular rubber bushing 24 has been forced over its tapered seating surface) in fluid tight relationship against a seating bushing 28 having a complementary internal tapered opening. The external diameter of the seating bushing 28 is slightly less than the internal diameter of sealing chamber S' to allow for an easy fit inside of sealing chamber S'. The outer end portion of the seating bushing 28 is threaded, as shown, the thread diameter being sufficiently smaller than the internal diameter of sealing chamber S' to accommodate a gasket 29 to bear against the end of sealing chamber S' and the end of the threaded portion of seating bushing 28. An adjusting nut 30 engages the threads of bushing 28 and enables a fine adjustment to be made in the tension mounting of the tubular rubber bushing 24. Gasket 29 is compressed by the transmitted force of the end cap 27 bearing against the wide face of seating bushing 28.

The tubular rubber bushing 24 before installation in the sealing chamber S or S' can have any premolded cross-sectional shape such as circular, ellipsoidal, rectangular, polygonal, etc., corresponding to the cross-sectional shape of the rod-like element to be sealed; usually, however, a circular cross-sectional shape is adequate for effectively sealing any rod-like element having a reasonable deviation from a true circular cross-sectional shape. When the rod-like element to be sealed is consistently of the same cross-sectional shape and area, then a rubber bushing, premolded to have a bore of the approximate cross-sectional shape and area as the rod-like element, can be mounted in the sealing chambers S and S' without requiring longitudinal extension since in such instances the automatically controlled fluid pressure in the sealed space applied to the outer peripheral surfaces of the tubular seal cannot constrict the seal enough to cause buckling or wrinkling of the inner peripheral surfaces of the bushing.

If the pressure-treating chamber is required to treat diverse shapes and diameters, such as are encountered in commercial extruding of plastic rods, tubes, angular strips or plastic coated wires of varying diameters, and it is desired to avoid the time-consuming operation of changing the rubber bushing to one of appropriate size or shape, a universal bushing can be obtained by mounting a rubber bushing having a circular orifice between the tapered retaining bushings so that the rubber bushing is stressed longitudinally. For instance, a one foot long flexible and elastic bushing made from natural rubber after vulcanization had an internal bore one-half inch in diameter in the relaxed state, and walls of an average thickness of one-eighth inch; this rubber tube, when mounted between the tapered retaining bushing of the sealing chambers S or S' so as to be stretched longitudinally about 15 per cent longer than the relaxed condition (resulting in a decrease of the orifice diameter in the absence of counteracting fluid pressure to $\frac{13}{32}$ in.) effectively sealed, without marring or scuffing, extruded plastic material having diameters varying from one-sixteenth inch to one inch. A similar rubber bushing having a molded internal bore of one inch diameter and likewise stretched 15 per cent longitudinally, thereby reducing the bore diameter to seven-eighths inch, effectively sealed extruded plastic material having diameters varying from one-fourth inch to one and one-half inches. The maximum diameter of extruded plastic material or other rod-like element passable through the sealing chamber is primarily limited by the size of the orifice diameters of the tapered retaining bushings 25a and 25b.

Baffle chamber B' in Fig. 2 has a supplementary internal chamber 31 fastened in abutting relationship to the end cap 27 with an interposed gasket 32. Chamber 31 is composed of several baffle plates 33, 34, 35 and 36, having orifices coaxial with the bore of the tubular seal 24, the orifice of baffle plate 33 being equivalent to or slightly larger than the orifice of the end cap 27 and the orifices of baffle plates 33, 34, 35 and 36 being progressively larger. Pressure fluid which escapes under certain operating conditions, such as with low differential fluid pressures, from pressure chamber C through the bore of rubber bushing 24 has its velocity progressively reduced by fluid that is successively trapped in the several chambers formed by the baffle plates 33, 34, 35 and 36, and the fluid emerges as a quiescent stream into a collecting chamber 37 having an outlet 38 into a sump 39 which is connected by the return pipe 19 to the supply tank T. An additional baffle plate 40 having an opening smaller than but coaxial with baffle plate 36, provides a second chamber 41 to collect fluid escaping under abnormal operating conditions; the collected fluid flows through opening 42 into the common sump 39.

In operating, for instance, on continuous lengths of extruded plastic material that have a consistent or average cross-sectional area less than that of the bore of the tubular bushing 24, the sequence after threading the plastic material through the various chambers, is as follows:

Differential valves 7a and 7b controlling the admittance of fluid to sealing chambers S and S' are adjusted to zero spring pressure so that there is little or no resistance to the flow of fluid to the chambers. The spring pressure of the differential valve 11 is adjusted to require for opening between 0.5 to 3.0 lbs. pressure per sq. in. or higher (depending upon the constrictive effect desired). Pressure pump 3 (or other supply of fluid pressure) is operated to simultaneously fill the pressure-treating chamber C and the sealing chambers S and S' with fluid under pressure; upon reaching the required operating pressure in the chamber C, the pressure can then be maintained by adjusting the speed of pressure pump 3, or by partially or completely opening exit valves 9a, 9b, 17 connected to the sealing chamber S, S', and the chamber C respectively. Whenever manufacturing reasons or operating conditions are such as to require a change of pressure in the pressure-treating chamber C, the only adjustments to be made in the system are in the operation of the pressure pump 3 (or other source of fluid pressure) to supply the desired higher or lower fluid pressure to the pressure-treating chamber C. The setting of the differential valves 7a, 7b and 11 need not be altered, providing fluid is being supplied to them at a pressure in excess of their opening resistance, since with the same setting the preselected pressure differential is maintained irrespective of the pressure at which the fluid is supplied to the system by the pressure pump or other means. For this reason a simple form of differential valve, such as a non-adjustable spring or gravity operated check valve of suitable opening resistance, can be substituted for the differential valve 11 herein described and shown in the accompanying drawings, whenever stability in operating conditions is such as to indicate the suitability of a fixed pressure differential.

When the sealing apparatus accommodates rod-like elements having consistent or average cross-sectional areas larger than the normal bore size (e. g. in the absence of counteracting fluid pressure) of the rubber bushing 24 then although a minor amount of constrictive pressure is supplied by the elasticity of the distended bushing, enough externally applied counteracting fluid pressure is needed to supplement this elastic sealing effort to slightly over-balance the pressure of the fluid tending to escape from the pressure-treating chamber C through the bore of the rubber bushing 24. Accordingly differential valve 11 connected to pressure chamber C is adjusted either to offer no resistance to the flow of pressure fluid or else to have a smaller pressure opening requirement than differential valves 7a and 7b. Obviously if in this instance the externally applied fluid pressures in the sealing chambers S and S' are excessively higher than the fluid in pressure-treating chamber C, the resultant constrictive effect by the rubber bushings 24 may be more than necessary for adequate sealing especially when the bushing is greatly expanded, and the excess constrictive pressure is dissipated as frictional heat injurious to the rubber bushing as well as to the surface of the penetrating rod-like element. By automatically maintaining the externally applied counteracting fluid in the sealing chambers at about the same or at a slightly lower pressure than the fluid in the pressure-treating chamber, particularly when the rod-like element comprises plastic material, the difference in pressure being constant irrespective of the degree of pressure in the treating chamber, an almost frictionless sealing result is possible since the constrictive effort resulting partly from the distention of the rubber bushing by the oversize rod and mostly from the externally applied fluid pressure can be substantially balanced against the opposing force of the confined fluid in the pressure-treating chamber.

While the operation of the fluid pressure regulating apparatus has been described with reference to the maintenance of equivalent constrictive effort by the respective rubber bushings 24 in entrant and exit sealing chambers S and S' respectively, an additional advantage possessed by the composite sealing and fluid pressure control apparatus is the ability to automatically maintain a lower or higher constrictive effort by either one of the rubber bushings. For instance, when the extruded plastic coating on a wire core is in a very soft condition upon emerging from the extruding machine E, a lower sealing pressure exerted by the rubber bushing in sealing chamber S will be less likely to distort or deform the plastic coating than after the plastic coating has been hardened by hot or cold fluid pressure treatment in the pressure treating chamber C allowing a higher sealing pressure to be exerted by the rubber bushing 24 in sealing chamber S' for a final smoothing operation on the more rigid plastic coating.

When the apparatus is to be operated in such a manner, and under conditions that the average or consistent cross-sectional area of the plastic length is smaller than the normal bore size of the rubber bushings, the differential valve 7a is adjusted to offer some opening resistance to the flow of fluid under pressure to entrant sealing chamber S, such resistance however being less than that effected by differential valve 11 controlling the pressure of the fluid in the pressure-treating chamber C but more than that effected by differential valve 7b. With such an adjustment, entrant sealing chamber S will be supplied with externally applied counteracting fluid at a pressure slightly higher than the fluid in the pressure-treating chamber C, but which is less than the externally applied counteracting pressure fluid in exit sealing chamber S'.

On the other hand, when the average or consistent cross-sectional area of the plastic rod is larger than the normal bore size of the rubber bushings, the externally applied counteracting fluid pressure in both sealing chambers is maintained at about the same or at a lower pressure than the fluid in the pressure-treating chamber C, but with the exit sealing chamber S' being supplied with fluid at a pressure higher than entrant sealing chamber S. This distribution of pressure differentials can be secured by adjusting the differential valve 11 connected to the pressure treating chamber C to have the lowest opening resistance, differential valve 7b connected to the exit sealing chamber S' to have a higher opening resistance and differential valve 7a connected to entrant sealing chamber S to have the highest opening resistance.

The invention has been successfully used in the treatment of wire coated with an extruded sheath of high molecular weight polyethylene. As this polymer is subject to shrinkage as high as 15 per cent upon cooling from the molten state, and such shrinkage occurs in unpredictable directions, as observed in the random formation of voids and bubbles in the cooled polymer, it is necessary that this shrinkage be controlled so as to cause a contraction of the polyethylene around and not away from the wire core. A controlled shrinkage of the extruded polyethylene coating causing the shrinkage to be directed inwardly toward the wire core and thereby also eliminating voids and/or bubbles in the polyethylene coating is obtained by passing the polyethylene coated wire through the pressure treating chamber in the presence of cooling water or other non-solvent liquid under moderate pressure.

A specific operational procedure for controlled fluid pressure cooling of 12 gauge copper wire having an extruded coating of polyethylene one-eighth inch thick, required the hot extruded coated wire emerging at a temperature of about 150° C. from the extruding machine and at a rate of about 40 feet per minute to enter the baffle chamber B in which trapped water at about 71° C. caused an initial surface chilling of the hot polyethylene coating, whereby a hard skin surface resistant to scuffing by the rubber bushing (normal bore diameter 0.75 inch) in sealing chamber B was obtained. The partly chilled coated wire was then drawn through pressure chamber C having a treating length of 40 feet containing water at a pressure between 10 to 80 lbs. per sq. in. but preferably 35 to 45 lbs. per sq. in. Water entering pressure chamber C through differential valve 11 is maintained at about 27° C. by cooling means not shown but which preferably are interposed between the pressure chamber and the cross fitting 5. The majority of water leakage from pressure chamber C takes place through the bore of the rubber bushing in entrant sealing chamber S which receives externally applied counteracting fluid at a pressure about ½ lb. per sq. in. higher than the fluid in pressure-treating chamber C. Water supplied to exit sealing chamber S' is maintained at a pressure about 1 to 2 lbs. higher than the water in pressure-treating chamber C. With the several differential valves adjusted to maintain these pressure differentials, water escaped through the bores of the rubber bushings at a constant rate of 2 to 3 gallons per minute sufficient for lubrication of the polyethylene surface. This leakage rate was not disturbed by fluctuations in the extruded thickness of the polyethylene occurring during the starting up period of the extruder. Water in the pressure chamber C therefore flows in a direction countercurrent to the travel of the coated wire, and as a result the water is heated to some extent by the hot plastic coated wire during its travel along the 40 foot treating chamber but mainly by controlled heating means, such as obtained by electric immersion heaters installed at suitable locations along the length of the pressure treating chamber; in this instance the water is at a temperature of about 70° C. as it escapes through sealing chamber S. This temperature gradient of the pressure fluid in pressure chamber C is obtained by adjustment of the heating means and the rate of water leakage through sealing chamber S is most effective in eliminating bubbles or voids in the polyethylene plastic while cooling and in causing the polyethylene to tightly adhere to the wire core.

The rubber bushings and pressure regulating control apparatus as disclosed herein are adaptable to any continuous operating pressure treating apparatus such as for curing or vulcanizing chambers for extruded thermo-reactive plastics in the form of rods, tubes, etc., or coverings on a continuous core, or for pressure cooling extruded thermoplastics such as cellulose acetate, polyvinyl chloride and acetate and the like. The sealing system is also useful in controlling the escape of lubricant from pressure lubricated bearings having shafts a portion of whose lengths are external to the pressure lubricating chambers, and for other similar application involving control of fluid pressure leakage in clearance spaces of rod-like elements emerging or entering an orifice of a pressure chamber.

What is claimed is:

1. In an apparatus including a container for fluid under pressure having an opening for the passing of a rod-like element therethrough, sealing means for the opening to regulate the escape of fluid about the rod-like element comprising in combination with the container a casing secured to the container about the opening and having one orifice open to and immediately adjacent to the opening and another orifice opposite thereto and in alignment therewith, a tubular bushing of elastic thin-walled material mounted within the casing and extending from the first-named orifice to the second-named orifice to form a continuous internal passage for the rod-like element and a sealed space for confining fluid under pressure in the casing, said bushing having a wall thinness and degree of elasticity transmitting substantially all the pressure of the confined fluid in the sealed space against the rod-like element but incapable per se of coacting with the rod-like element to form a substantial seal, a common source of fluid pressure having connections to the container and to the sealed space, and interposed between the source of fluid pressure and one of the connections a differential valve having an opening resistance effective to automatically maintain a selected differential in fluid pressure between the fluid in the container and the fluid in the sealed space.

2. In an apparatus including a container for fluid under pressure having an opening for the passing of a rod-like element therethrough, sealing means for the opening to regulate the escape of fluid about the rod-like element comprising in combination with the container a casing secured to the container about the opening and having one orifice open to and immediately adjacent to the opening and another orifice opposite thereto and in alignment therewith, a tubular bushing of elastic thin-walled material mounted within the casing and longitudinally stretched in extending from the first-named orifice to the second-named orifice to form a continuous internal passage for the rod-like element and a sealed space for confining fluid under pressure in the casing, said bushing having a wall thinness and degree of elasticity transmitting substantially all the pressure of the confined fluid in the sealed space against the rod-like element but incapable per se of coacting with the rod-like element to form a substantial seal, a common source of fluid pressure having connections to the container and to the sealed space, and interposed between the source of fluid pressure and one of the connections a differential valve having an opening resistance effective to automatically maintain a selected differential in fluid pressure between the fluid in the container and the fluid in the sealed space.

3. In an apparatus including a container for fluid under pressure having an opening for the passing of a rod-like element therethrough, sealing means for the opening to regulate the escape of fluid about the rod-like element comprising in combination with the container a casing secured to the container about the opening and having one orifice open to and immediately adjacent to the opening and another orifice opposite thereto and in alignment therewith, a tubular bushing of elastic thin-walled material having a bore of larger cross-sectional area than the rod-like element mounted within the casing and longitudinally stretched in extending from the first-named orifice to the second-named orifice to form a continuous internal passage for the rod-like element and a sealed space for confining fluid under pressure in the casing, said bushing having a wall thinness and degree of elasticity transmitting substantially all the pressure of the confined fluid in the sealed space against the rod-like element but incapable per se of coacting with the rod-like element to form a substantial seal, a common source of fluid pressure having connections to the container and to the sealed space, and interposed between the source of fluid pressure and the connection to the container a differential valve having an opening resistance effective to automatically maintain at a selected differential a lower fluid pressure in the container than in the sealed space.

4. In an apparatus including a container for fluid under pressure having an opening for the passing of a rod-like element therethrough, sealing means for the opening to regulate the escape of fluid about the rod-like element comprising in combination with the container a casing secured to the container about the opening and having one orifice open to and immediately adjacent to the opening and another orifice opposite thereto and in alignment therewith, a tubular bushing of elastic thin-walled material having a bore of smaller cross-sectional area than the rod-like element mounted within the casing and extending from the first-named orifice to the second-named orifice to form a continuous internal passage for the rod-like element and a sealed space for confining fluid under pressure in the casing, said bushing having a wall thinness and degree of elasticity transmitting substantially all the pressure of the confined fluid in the sealed space against the rod-like element but incapable per se of coacting with the rod-like element to form a substantial seal, a common source of fluid pressure having connections to the container and to the sealed space, and interposed between the source of fluid pressure and one of the connections a differential valve having an opening resistance to automatically maintain a selected differential in fluid pressure between the fluid in the container and the fluid in the sealed space.

5. In an apparatus including a container for fluid under pressure having entrant and exit openings for the passing of a rod-like element therethrough, sealing means for the openings to regulate the escape of fluid about the rod-like element comprising in combination with the container a casing secured to the container at the entrant opening, a second casing secured to the container at the exit opening, each casing having one orifice open to and immediately adjacent to the opening at which it is secured and a second orifice opposite thereto and in alignment therewith, a separate tubular bushing of elastic thin-walled material mounted within each casing and extending from the first-named orifice to the second-named orifice to form a continuous internal passage for the rod-like element and a sealed space for confining fluid under pressure within the respective casing, said bushing having a wall thinness and degree of elasticity transmitting substantially all the pressure of the confined fluid in the sealed space against the rod-like element but incapable per se of coacting with the rod-like element to form a substantial seal, a common source of fluid pressure having connections to the container and to the sealed space of each casing, and a differential valve interposed between the source of fluid pressure and the connection to the container, said valve having an opening resistance to automatically maintain a selected differential in fluid pressure between the fluid in the container and the fluid in the sealed spaces.

6. In an apparatus including a container for fluid under pressure having exit and entrant openings for the passing of a rod-like element therethrough, sealing means for the openings to regulate the escape of fluid about the rod-like element comprising in combination with the container a casing secured to the container about the entrant opening, a second casing secured to the container at the exit opening, each casing having one orifice open to and immediately adjacent to the opening about which the casing is secured and a second orifice opposite thereto and in alignment therewith, a separate tubular bushing of elastic thin-walled material having a bore of larger cross-sectional area than the rod-like element each bushing being mounted within each casing and longitudinally stretched in extending from the first-named orifice to the second-named orifice of its respective casing to form a continuous internal passage for the rod-like element and a sealed space for confining fluid under pressure within the respective casing, said bushing having a wall thinness and degree of elasticity transmitting substantially all the pressure of the confined fluid in the sealed space against the rod-like element but incapable per se of coacting with the rod-like element to form a substantial seal, a common source of fluid pressure having connections to the container and to the sealed spaces, and interposed between the source of fluid pressure and the connection to the container a differential valve having an opening resistance to automatically maintain at a selected differential a lower fluid pressure in the container than in the sealed spaces.

7. In an apparatus including a container for fluid under pressure having an exit and an entrant opening for the passing of a rod-like element therethrough, sealing means for the openings to regulate the escape of fluid about the rod-like element comprising in combination with the container a casing secured to the container about the entrant opening, a second casing secured to the container about the exit opening, each casing having one orifice open to and immediately adjacent to the opening about which the casing is secured and a second orifice opposite thereto and in alignment therewith, in each casing a separate tubular bushing of elastic thin-walled material having a bore of larger cross-sectional area than the rod-like element, each bushing being mounted within its respective casing and longitudinally stretched in extending from the first-named orifice to the second-named orifice to form a continuous internal passage for the rod-like element and a sealed space for confining fluid under pressure in the respective casing, said bushing having a wall thinness and degree of elasticity transmitting substantially all the pressure of the confined fluid in the sealed space against the rod-like element but incapable per se of coacting with the rod-like element to form a substantial seal, a common source of fluid pressure having connections to each sealed space and to the container, and interposed between the source of fluid pressure and each connection a differential valve having an opening resistance to automatically maintain at selected differentials a lower fluid pressure in the container than in the sealed spaces.

8. In an apparatus including a container for fluid under pressure having entrant and exit openings for the passing of a rod-like element therethrough, sealing means for the openings to regulate the escape of fluid about the rod-like element comprising in combination with the container a casing secured to the container at the entrant opening, a second casing secured to the container at the exit opening, each casing having one orifice open to and immediately adjacent to the opening at which it is secured and a second orifice opposite thereto and in alignment therewith, in each casing a separate tubular bushing of elastic thin-walled material having a bore of smaller cross-sectional area than the rod-like element, each bushing being mounted within its respective casing and extending from the first-named orifice to the second-named orifice to form a continuous internal passage for the rod-like element and a sealed space for confining fluid under pressure in the respective casings, said bushing having a wall thinness and degree of elasticity transmitting substantially all the pressure of the confined fluid in the sealed space against the rod-like element but incapable per se of coacting with the rod-like element to form a substantial seal, a common source of fluid pressure having connections to each sealed space and to the container, and interposed between the source of fluid pressure and each connection to a sealed space a differential valve having an opening resistance to automatically maintain at a selected differential a lower fluid pressure in each sealed space than in the container.

9. In an apparatus including a container for fluid under pressure having a plurality of openings for the passing of rod-like elements therethrough, sealing means for each opening to regulate the escape of fluid about the rod-like element, comprising in combination with the container a separate casing secured to the container about each opening, each casing having an orifice open to and immediately adjacent to the opening about which it is secured and a second orifice opposite thereto and in alignment therewith, in each casing a separate tubular bushing of elastic thin-walled material mounted within its respective casing and extending from the first-named orifice to the second-named orifice to form a continuous internal passage for the rod-like element and a sealed space for confining fluid under pressure within the respective casing, said bushing having a wall thinness and degree of elasticity transmitting substantially all the pressure of the confined fluid in the sealed space against the rod-like element but incapable per se of coacting with the rod-like element to form a substantial seal, a common source of fluid pressure having connections to the container and to the sealed space of each casing, and interposed between the source of fluid pressure and each connection a differential valve having an opening resistance to automatically maintain the pressure of the fluid emerging therefrom at a selected differential in pressure from the pressure of the fluid at the common source.

HERBERT A. SWALLOW.
THOMAS A. DE VILBISS.

REFERENCES CITED

The following references are of record in the file of this patent:

UNITED STATES PATENTS

| Number | Name | Date |
|---|---|---|
| 1,477,879 | Kilborn et al. | Dec. 18, 1923 |
| 1,689,206 | Lamplough | Oct. 30, 1928 |
| 2,029,435 | Moody et al. | Feb. 4, 1936 |
| 2,193,587 | Fortune et al. | Mar. 12, 1940 |
| 2,193,887 | Seeley | Mar. 19, 1940 |
| 2,227,814 | Tyler | Jan. 7, 1941 |
| 2,291,344 | Powell | July 28, 1942 |
| 2,307,575 | Davis | Jan. 5, 1943 |